UNITED STATES PATENT OFFICE.

THOMAS J. MAYALL, OF ROXBURY, MASSACHUSETTS.

IMPROVEMENT IN THE MANUFACTURE OF INDIA-RUBBER HOSE.

Specification forming part of Letters Patent No. 26,276, dated November 29, 1859; reissue No. 5,111, dated October 22, 1872.

*To all whom it may concern:*

Be it known that I, THOMAS J. MAYALL, of Roxbury, in the county of Norfolk and State of Massachusetts, have invented a new and useful Improvement in the Manufacture of Hose or Tubing, of which the following is a full and exact description:

The object of my invention is an India-rubber hose whose durability will not be impaired by the premature decay of the canvas upon which the strength depends.

The India-rubber hose or tubing in common use previous to my improvement is composed of layers of canvas coated with India rubber and vulcanized, the art of making which is well known. The trouble in the use of this hose arises from the fact that the canvas decays rapidly, either in consequence of being wet or of the effect of the sulphur with which the rubber is vulcanized, and the hose becomes unable to endure the water-pressure to which it is subjected. I have discovered how this trouble may be averted and a hose produced which will not prematurely decay.

The mode I employ is to treat the fibrous fabric upon which the strength of the hose depends with antiseptics which are well known, such as corrosive sublimate, chloride of zinc, pyrolignite of iron, oil of tar, and other bituminous, pitchy, or resinous matters, or other similar substances, either by immersing the fabric and afterward drying it or by placing it in any suitable vessel and exhausting the air so that the preservative solution will be forced in by pressure, or in any other proper manner. The strength of the solution and the length of time that the fabric shall remain in it can of course be varied, but the strength of the liquid and the time occupied should be sufficient to cause the fabric to be thoroughly impregnated.

Having thus described my improvement, I state my claim as follows:

1. In India-rubber hose, the application of some of the preservative compounds herein mentioned or their equivalent antiseptics to hose, so as to preserve the same, substantially as described.

2. The improved India-rubber hose prepared by combining some of the substances herein named or their equivalent antiseptics with the fibrous material composing the same, substantially as described.

THOS. J. MAYALL.

Witnesses:

WM. W. MAYALL,

E. H. CHEESE.